INVENTORS,
YUTAKA KIMURA
YOSHIO ARIIZUMI
YUTAKA MASUDA
TERUHIRO YAMAGAMI
YASUSHI OKITA
BY Watson, Cole, Grindle & Watson
ATTORNEYS INVENTORS,
YUTAKA KIMURA
YOSHIO ARIIZUMI
YUTAKA MASUDA
TERUHIRO YAMAGAMI
YASUSHI OKITA
BY
Watson, Cole, Grindle & Watson
ATTORNEYS Fig. 3a SPECIAL SERVICE COMMON CIRCUIT 2
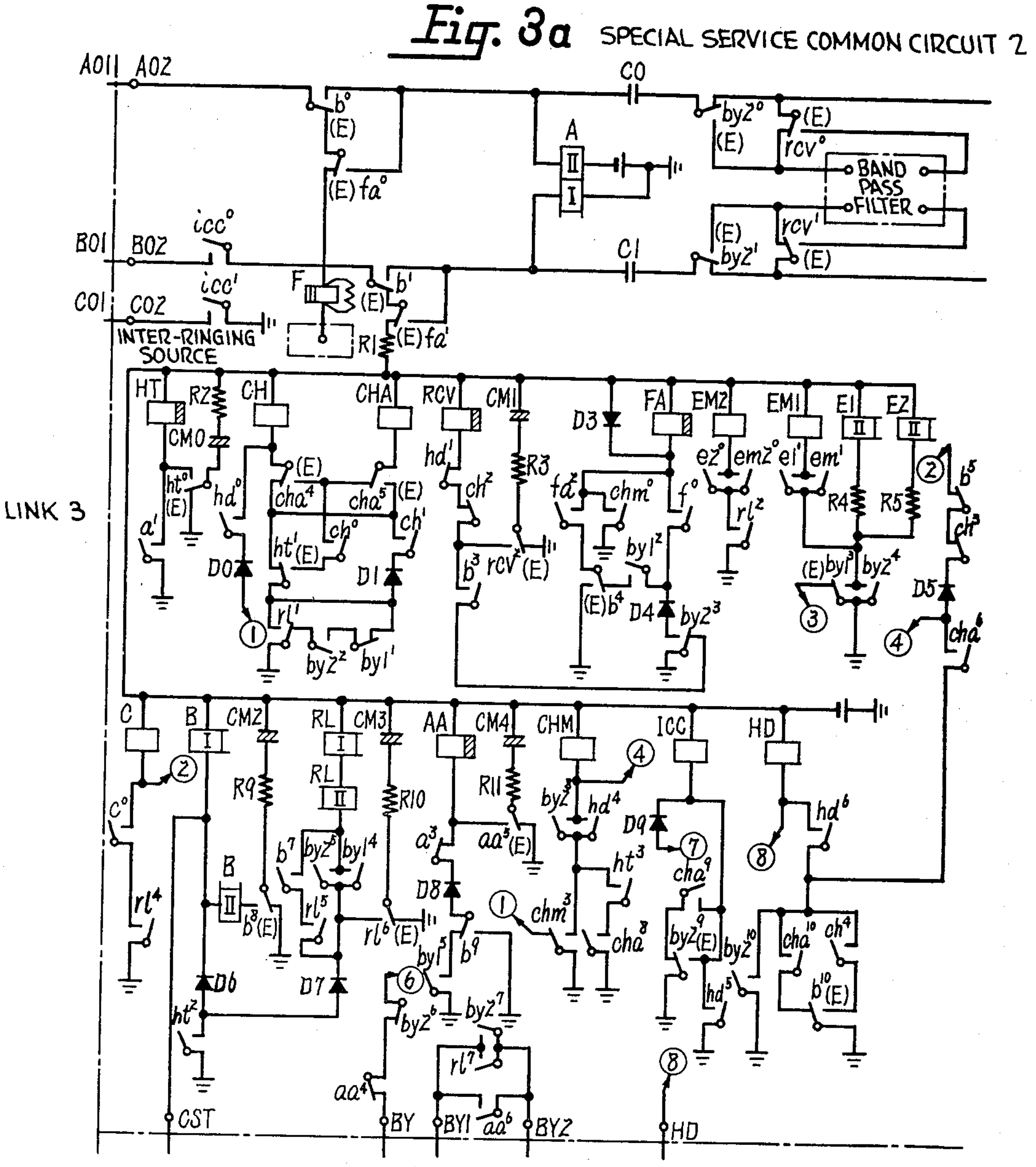
LINK CONTROLLER 4
INVENTORS,
YUTAKA KIMURA
YOSHIO ARIIZUMI
YUTAKA MASUDA
TERUHIRO YAMAGAMI
YASUSHI OKITA
BY Watson, Cole, Grindle & Watson
ATTORNEYS INVENTORS,
YUTAKA KIMURA
YOSHIO ARIIZUMI
YUTAKA MASUDA
TERUHIRO YAMAGAMI
YASUSHI OKITA
BY Watson, Cole, Grindle & Watson
ATTORNEYS INVENTORS,
YUTAKA KIMURA
YOSHIO ARIIZUMI
YUTAKA MASUDA
TERUHIRO YAMAGAMI
YASUSHI OKITA
BY
Watson, Cole, Grindle & Watson
ATTORNEYS

Jan. 30, 1973 YUTAKA KIMURA ET AL 3,714,378

SPECIAL SERVICE SPEECH TRANSFER EQUIPMENT FOR TELEPHONE EXCHANGE SYSTEMS

Filed Dec. 10, 1969

7 Sheets-Sheet 6

INVENTORS,
YUTAKA KIMURA
YOSHIO ARIIZUMI
YUTAKA MASUDA
TERUHIRO YAMAGAMI
YASUSHI OKITA

BY Watson, Cole, Grindle & Watson
ATTORNEYS

Jan. 30, 1973 YUTAKA KIMURA ET AL 3,714,378

SPECIAL SERVICE SPEECH TRANSFER EQUIPMENT FOR TELEPHONE EXCHANGE SYSTEMS

Filed Dec. 10, 1969 7 Sheets-Sheet 7

INVENTORS,
YUTAKA KIMURA
YOSHIO ARIIZUMI
YUTAKA MASUDA
TERUHIRO YAMAGAMI
YASUSHI OKITA

BY Watson, Cole, Grindle & Watson
ATTORNEYS

United States Patent Office 3,714,378
Patented Jan. 30, 1973

3,714,378

SPECIAL SERVICE SPEECH TRANSFER EQUIPMENT FOR TELEPHONE EXCHANGE SYSTEMS

Yutaka Kimura and Yoshio Ariizumi, Tokyo, Yutaka Masuda, Hasuda-machi, Teruhiro Yamagami, Yokohama, and Yasushi Okita, Tokyo, Japan, assignors to Nippon Telegraph and Telephone Public Corporation and Oki Electric Industry Co., Ltd., both of Tokyo, Japan Filed Dec. 10, 1969, Ser. No. 883,871
Int. Cl. H04m *3/42*
U.S. Cl. 179—18 B 3 Claims

ABSTRACT OF THE DISCLOSURE

A special service subscriber circuit associated with each subscriber is connected by a link to a common special service circuit. A speech connection is formed via the speech connection of the telephone switching equipment through the special service subscriber circuit by diverting the speech connection into the special service common circuit from the special service subscriber circuit through the link by flashing the hook switch of the special service subscriber. Call waiting and holding services are provided on the special service speech connections which are different from the normal speech connections.

This invention relates to a telephone exchange system, and more particularly to a special service control system wherein a special service can be connected in an automatic telephone exchange system.

Though there are various special telephone exchange services, the invention is described with respect to a call-waiting service and holding service.

In the following description relating to a call-waiting service, with telephone subscribers A, B and C, the subscriber A is a call-waiting service subscriber and the subscribers B and C may be or may not be call-waiting service subscribers.

Now, while the service subscriber A and the subscriber B are speaking with each other, there may be an incoming call for the service subscriber A from another subscriber C, and an indication thereof (for example, by a sound or lamp) informing the service subscriber A that an incoming call is made. When the service subscriber A confirms the indication of the incoming call, he sends out a transfer signal (for example, by placing the telephone on hook). By the above mentioned transfer signal, the speech connection is transferred and the service subscriber A is connected with subscriber C. In this case, a waiting signal is sent out for the subscriber B to wait. Thereafter, by sending out a transfer signal, the service subscriber A can freely alternately transfer his connection to the subscribers B and C any number of times. The above is the summary of a special service generally called a call waiting service.

In the following description relating to a holding service, with telephone subscribers A, B and C, the subscriber A is a holding service subscriber and the subscribers B and C may be or may not be holding service subscribers.

Now, while the service subscriber A and the subscriber B are speaking with each other, in case there occurs a need for the service subscriber A to speak with the subscriber C, a dial tone is sent to the service subscriber A. Having heard the dial tone, the service subscriber A dials the telephone number of the subscriber C to call and speak to the subscriber C. Thereafter, by sending out a transfer signal, the service subscriber A can freely alternately transfer to either of the subscribers B and C to speak to either one of them any number of times. The above is the summary of the function of a special service generally called a holding service.

An object of the present invention is to provide an improved telephone speech path transfer system which provides a special service of the type referred to.

In a conventional system for realizing a special service, speech transfer equipment having a special service function has been required for each service subscriber. When it is taken into consideration that the special service call usage is less than the general speech call usage, the efficiency of such speech transfer equipment is very low and uneconomical.

A feature of the present invention is that a special service subscriber circuit corresponding to a subscriber and a special service common circuit to be used in common by a plurality of subscribers are provided between a subscriber telephone and a telephone switchboard and are linked with each other so that the efficiency of the special service common circuit may be increased, the equipment cost per service subscriber may be reduced and a special service may be provided economically.

Another feature of the present invention is that, by a transfer signal from a service subscriber, a speech connection is formed in the above mentioned special service common circuit and the above mentioned subscriber circuit, and is transferred and connected in the above mentioned special service common circuit so that a special service circuit is provided.

The present invention has application to a telephone exchange system and is best adapted particularly to a common controlled automatic telephone exchange system.

The above mentioned and other objects and features of the present invention will be made clear by the embodiments of a commonly controlled automatic telephone exchange system to be explained in detail in the following.

Figure 1:
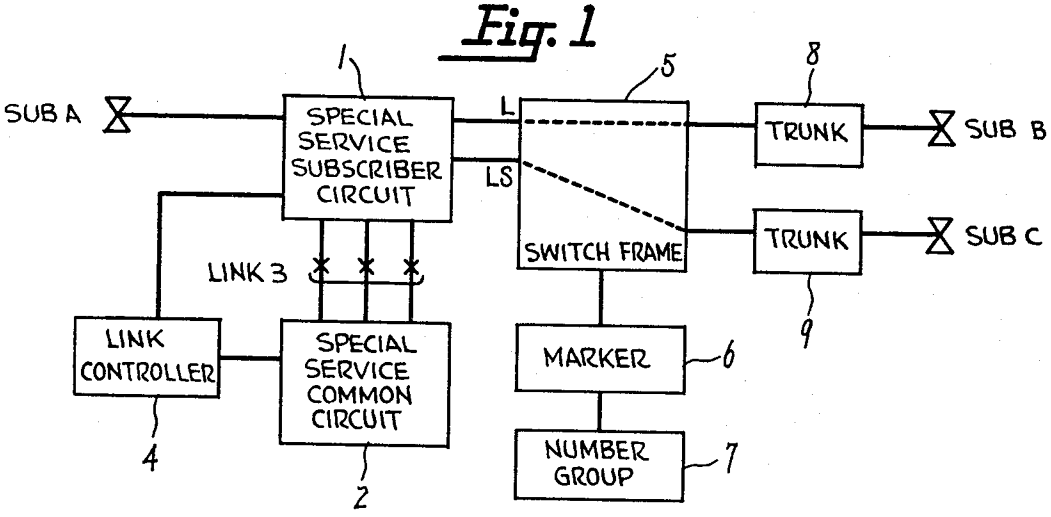
FIG. 1 is a block diagram of the first embodiment of the present invention showing devices required to make a special service and their operating relationships.
Figure 4:
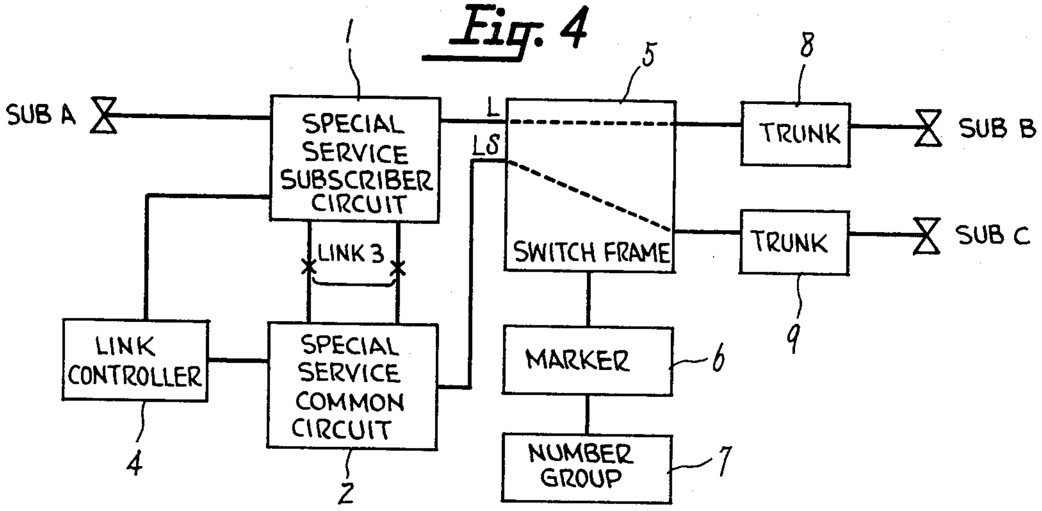
Figure 3B:
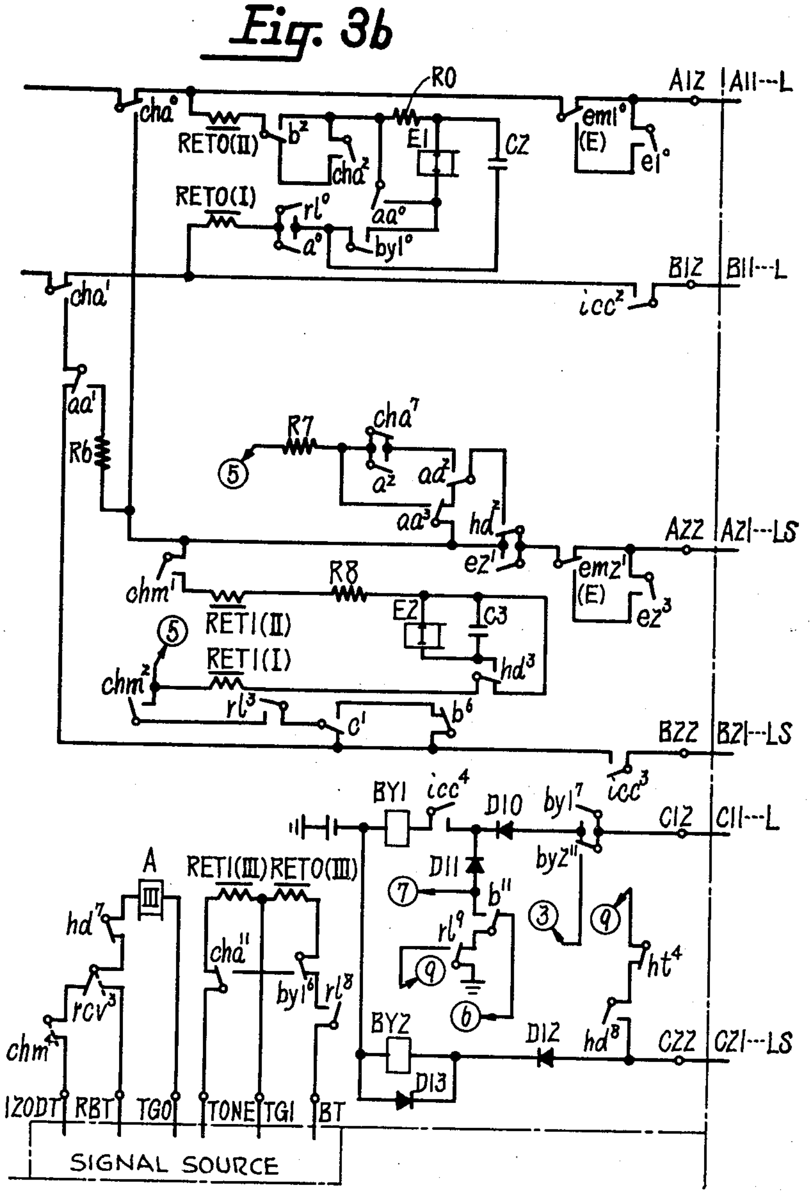
Figure 5:
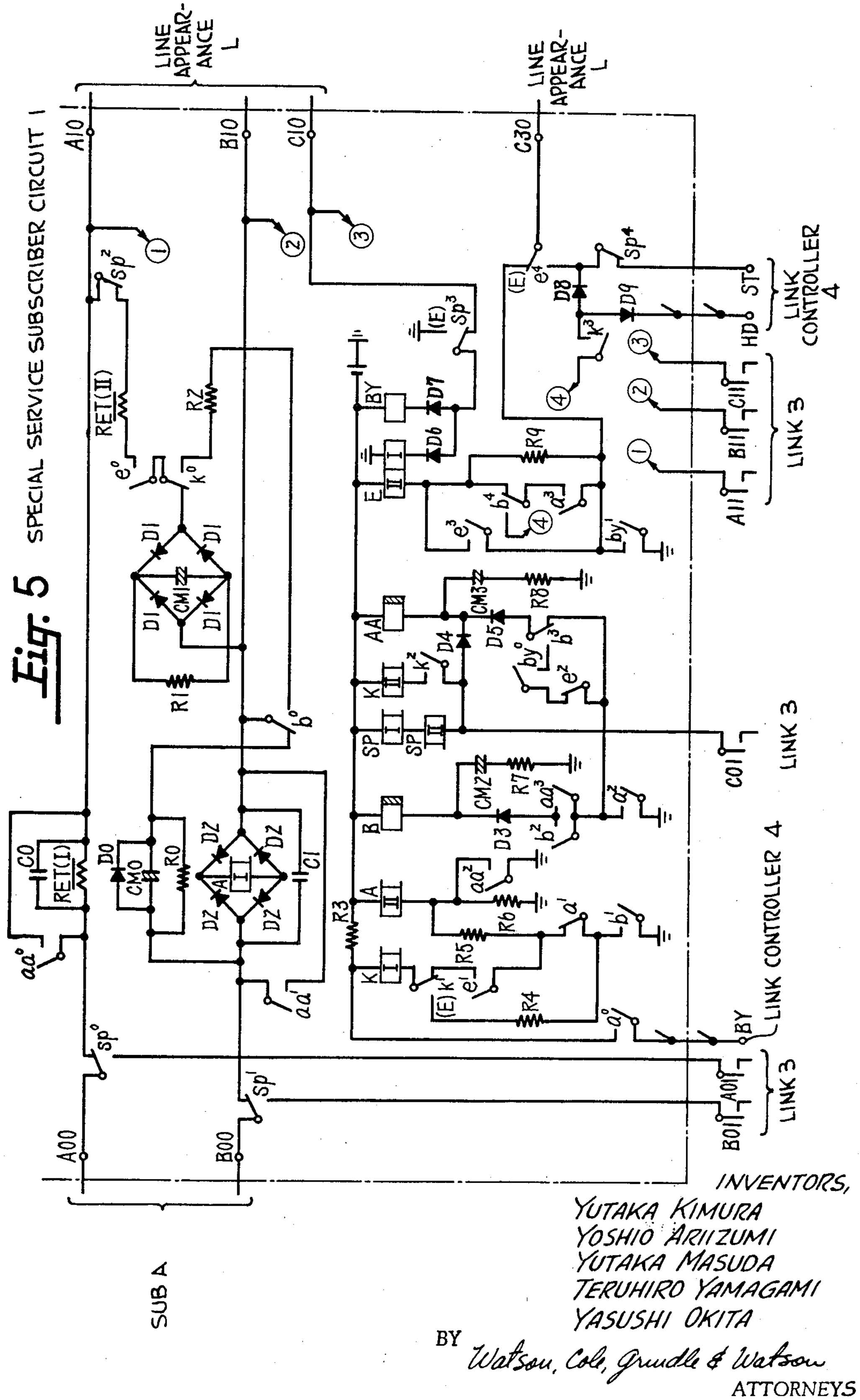
Figure 6A:
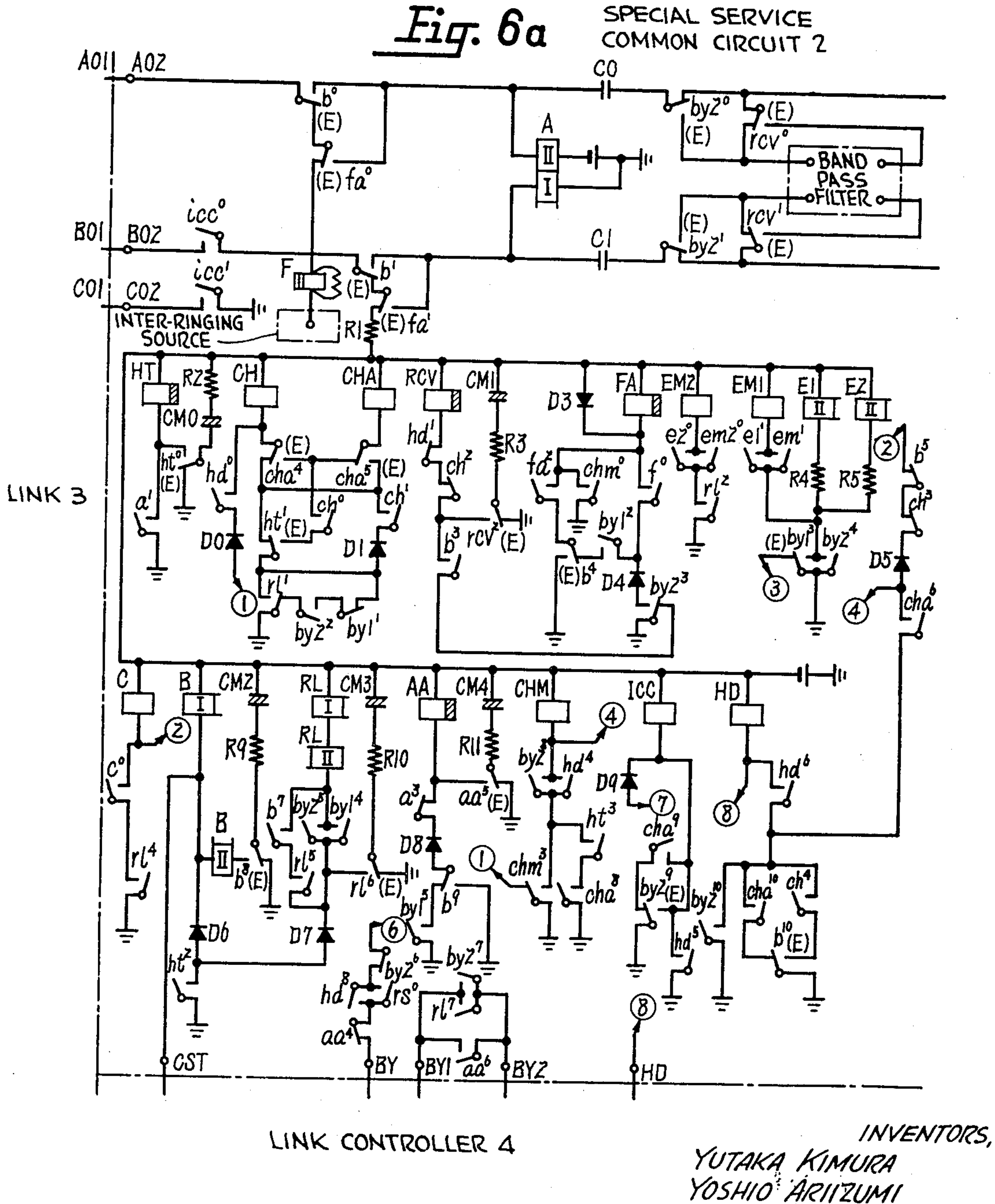
Figure 6B:
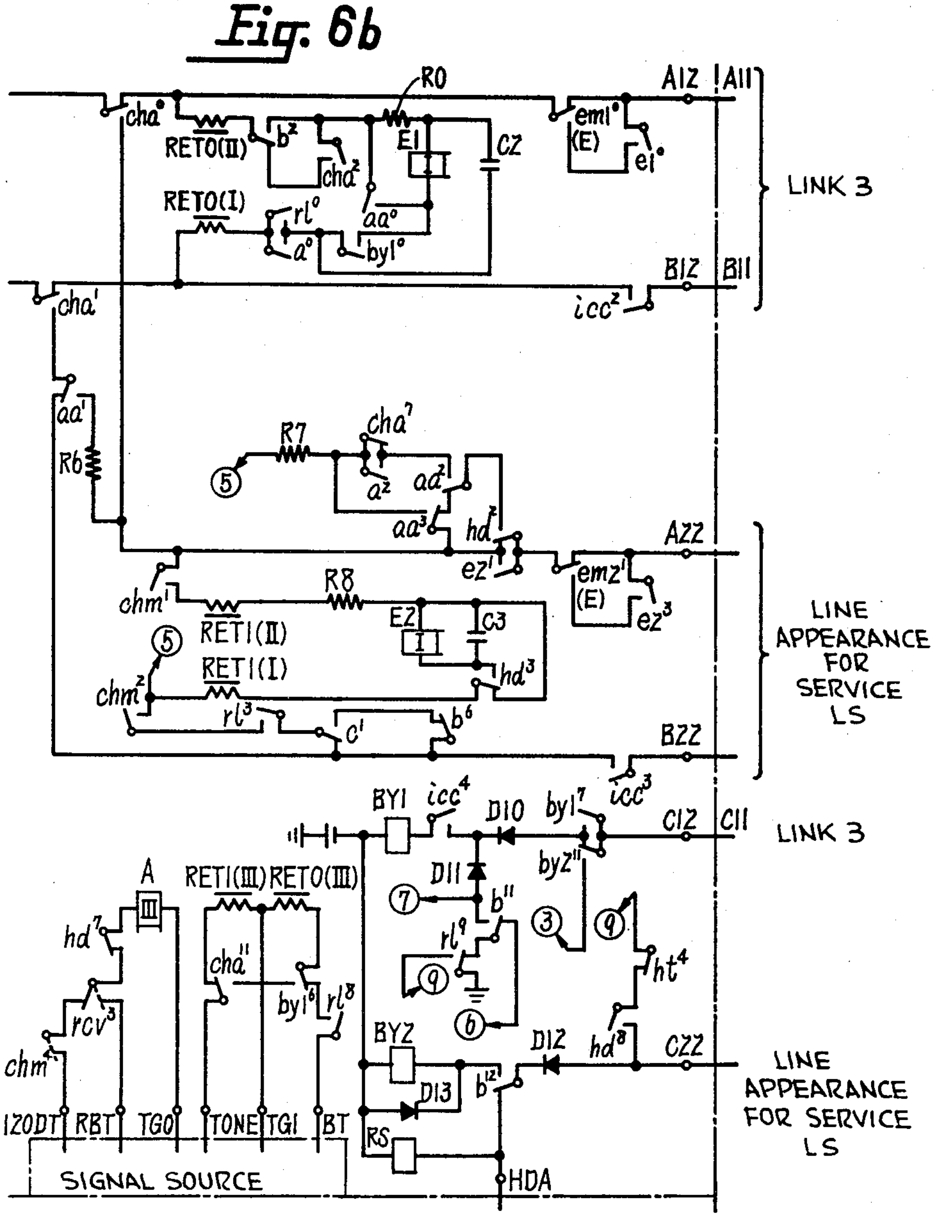

FIGS. 3*a* and 3*b* are a schematic of the special service common circuit embodiment of FIG. 1;

FIG. 4 is a block diagram of the second embodiment of the present invention showing devices required to make a special service and their operating relationships;

FIG. 5 is a diagram showing an embodiment of the special service subscriber circuit in FIG. 4;

FIGS. 6*a* and 6*b* are a schematic of the special service common circuit embodiment of FIG. 4.

FIG. 1 shows the first embodiment of and as applied to a common controlled automatic telephone exchange system, and relates to a special service subscriber circuit 1 and a special service common circuit 2. Therefore, other devices than those that are required to understand the present invention are not shown.

Further, in the following description, the subscriber telephones SUB A, SUB B and SUB C, link 3, link controller 4, switch frame 5, marker 6, number group 7 and trunks 8 and 9 have the same functions as those already known in the field of this invention and are not explained in detail.

In this embodiment and the later described second embodiment, the common controlled automatic telephone switchboard is represented by the switch frame 5, marker 6 and number group 7 as is well known to the art.

The special service subscriber circuit 1 has a function of cutting a speech connection into the special service common circuit 2 by a transfer signal (for example, placing the telephone on hook) from the service subscriber SUB A or an incoming signal into the service line appearance LS from the switchboard side to provide a special service connection. Special service subscriber circuit 1 is provided to a special service subscriber and is connected to the telephone of special service subscriber telephone SUB A. Further, the special service subscriber circuit 1 is connected to the switch frame 5 of the switchboard through the line appearance L and service line appearance LS on the side opposite the above mentioned side. Further, the special service subscriber circuit 1 is connected with the special service common circuit 2 through link 3. The line appearance L and service line appearance LS well-known functions, namely, in the case of an ordinary speech, the line appearance L may be used and, in the case of a special service, the service line appearance LS may be used.

A proper number of special service common circuits 2 are set in response to the service calls of a group of service subscribers so as to be used in common thereby and have a function of transferring speech connections by a transfer signal from the service subscriber SUB A.

As mentioned above, the special service subscriber circuit 1 is provided to correspond to the service subscriber. On the other hand, the special service common circuit 2 is set so as to be used in common by a group of a plurality service subscribers. Therefore, they are connected with each other through the link 3 controlled by the link controller 4.

The following is a description of a call-waiting service.

Now, while the service subscriber SUB A is speaking with the subscriber SUB B (through the service subscriber SUB A—special service subscriber circuit 1—line appearance L—switch frame 5—trunk 8—subscriber SUB B) if there is an incoming call to the service subscriber SUB A through the trunk 9 and switch frame 5 from the subscriber SUB C, the marker 6 receives the telephone number of the service subscriber SUB A by a known method and transfers the telephone number to the number group 7. In the number group 7, as a representative circuit is formed by the line appearance L and service line appearance LS of the switch frame 5 corresponding to the service subscriber SUB A, if the service subscriber SUB A is vacant, the number group 7 sends the position information of the line appearance L back to the marker 6 and, if the service subscriber SUB A is speaking, the number group 7 sends the position information of the service line appearance LS back to the marker 6. In this case, as the service subscriber SUB A is speaking with the subscriber SUB B, the number group 7 sends the position information of the service line appearance LS back to the marker 6. The marker 6 controls the switch frame 5 from the line position information of the service line appearance LS in the switch frame 5 and the line position information of the trunk 9 is received by a known method. The trunk 9 and the special service subscriber circuit 1 are connected with each other through the switch frame 5. By the above mentioned connection, the special service subscriber ciruit 1 receives the incoming signal to the service line appearance LS from the subscriber SUB C and initiates operation of the link controller 4. The link controller 4 selects and obtains access to the vacant special service common circuit 2 and connects the special service subscriber circuit 1 and the special service common circuit 2 with each other by closing the link 3.

Thus, the speech connection is cut into the special service common circuit 2 by the special service subscriber circuit 1 and the service subscriber SUB A is connected with the subscriber SUB B through the special service common circuit 2. A network comprising the service subscriber SUB A—special service subscriber circuit 1—link 3—special service common circuit 2—link 3—special service subscriber circuit 1—line appearance L—switch frame 5—trunk 8—subscriber SUB B—is formed. When the above mentioned speech route is made, the special service common circuit 2 sends an incoming call-indicating signal to the service subscriber SUB A who is speaking and informs him that there is an incoming call from the subscriber SUB C.

An example of the incoming call-indicating signal is as follows. The special service common circuit 2 first sends out a calling signal for about one second to the service subscriber SUB A and then sends out an intermittent originating call signal to the service subscriber SUB A and subscriber SUB B until the service subscriber SUB A responds to the calling subscriber SUB C.

If the service subscriber SUB A sends out a transfer signal by depressing the hook, the special service common circuit 2 receives the transfer signal, holds the line appearance L side which is speaking and transfers and connects the speech path connection on the service subscriber SUB A side to the service line appearance LS side. The service subscriber SUB A responds to the subscriber SUB C through the speech network the service subscriber SUB A—special service subscriber circuit 1—link 3—special service common circuit 2—link 3—special service subscriber circuit 1—service line appearance LS—switch frame 5—trunk 9—subscriber SUB C.

Thereafter by sending out a transfer signal by depressing the hook, the service subscriber SUB A can freely alternately transfer to the subscribers SUB B and SUB C through the special service common circuit 2 to speak with them any number of times.

Further, when the service subscriber SUB A disconnects the speech path to the subscriber SUB C, the subscriber SUB A flashes the telephone hook-switch for a longer duration than the duration of the transfer signal after the speech path between the subscriber SUB A and the subscriber SUB C was formed. By the above mentioned operation the special service common circuit is restored. Then the speech path between the subscriber SUB A and the subscriber SUB B is formed.

The following is a description of a holding service. When the service subscriber SUB A speaking with the subscriber SUB B through the speech route—service subscriber SUB A—special service subscriber circuit 1—line appearance L—switch frame 5—trunk 8—subscriber SUB B—is to call the subscriber SUB C, the service subscriber SUB A tells the other subscriber SUB B who is being spoken to that the speech shall be interrupted in order to call the third person and then sends out a transfer signal to the special service subscriber circuit 1 by hooking the telephone. The special service subscriber circuit 1 receives the transfer signal and initiates operation of the link controller 4. The link controller 4 selects and obtains access to the vacant special service common circuit 2 and connects the special service subscriber circuit 1 and special service common circuit 2 with each other by closing the link 3.

Thus the speech connection is formed within the special service common circuit 2 by the special service subscriber circuit 1 and a network through the service subscriber SUB A—special service subscriber circuit 1—link 3—special service common circuit 2—link 3—special service subscriber circuit 1—line appearance L—switch frame 5—trunk 8—subscriber SUB B is formed. As soon as the above mentioned network is made, the speech connection is transferred to the service line appearance LS side by the special service common circuit, the line appearance L side is held and a waiting signal is sent to the subscriber SUB B. The service subscriber SUB A is connected to a well known originating call register (not illustrated) through the transferred service line appearance LS and receives an originating-call signal the same as in well known originating call connections. Thereafter, by dialing the telephone number of the third subscriber SUB C, the service subscriber SUB A is connected with the subscriber SUB C by well known exchange connecting methods. That is to say, a network through the service subscriber SUB A—special service subscriber circuit 1—link 3—special service common circuit 2—link 3—special service subscriber circuit 1—service line appearance LS— switch frame 5—trunk 9—subscriber SUB C is formed and the service subscriber SUB A can speak with the subscriber SUB C.

Thereafter, the operation is the same as described above in the call-waiting service. That is, by sending out a transfer signal by hooking the telephone receiver, the service subscriber SUB A can freely alternately transfer to the subscriber SUB B and SUB C through the special service common circuit 2 and can speak with either of them any number of times.

Further, when the service subscriber SUB A disconnects the speech path with the subscriber SUB C, the subscriber SUB A flashes the telephone hook-switch for a longer duration than the duration of the transfer signal after the speech path between the subscriber SUB A and the subscriber SUB C was formed. By the above mentioned operation the special service common circuit is restored. Then, the speech path between the subscriber SUB A and the subscriber SUB B is formed.

The first embodiment of the invention is described in detail hereinafter with reference to the specific circuit diagrams shown in FIGS. 2 and 3.

In the indicating method which is also the same in FIGS. 5 and 6, the relay is represented by a capital letter, its contact is represented by the lower case alphabet letter and the different windings of the same component part are represented by such letters as I, II and III.

CALL-WAITING SERVICE

Figure 2:
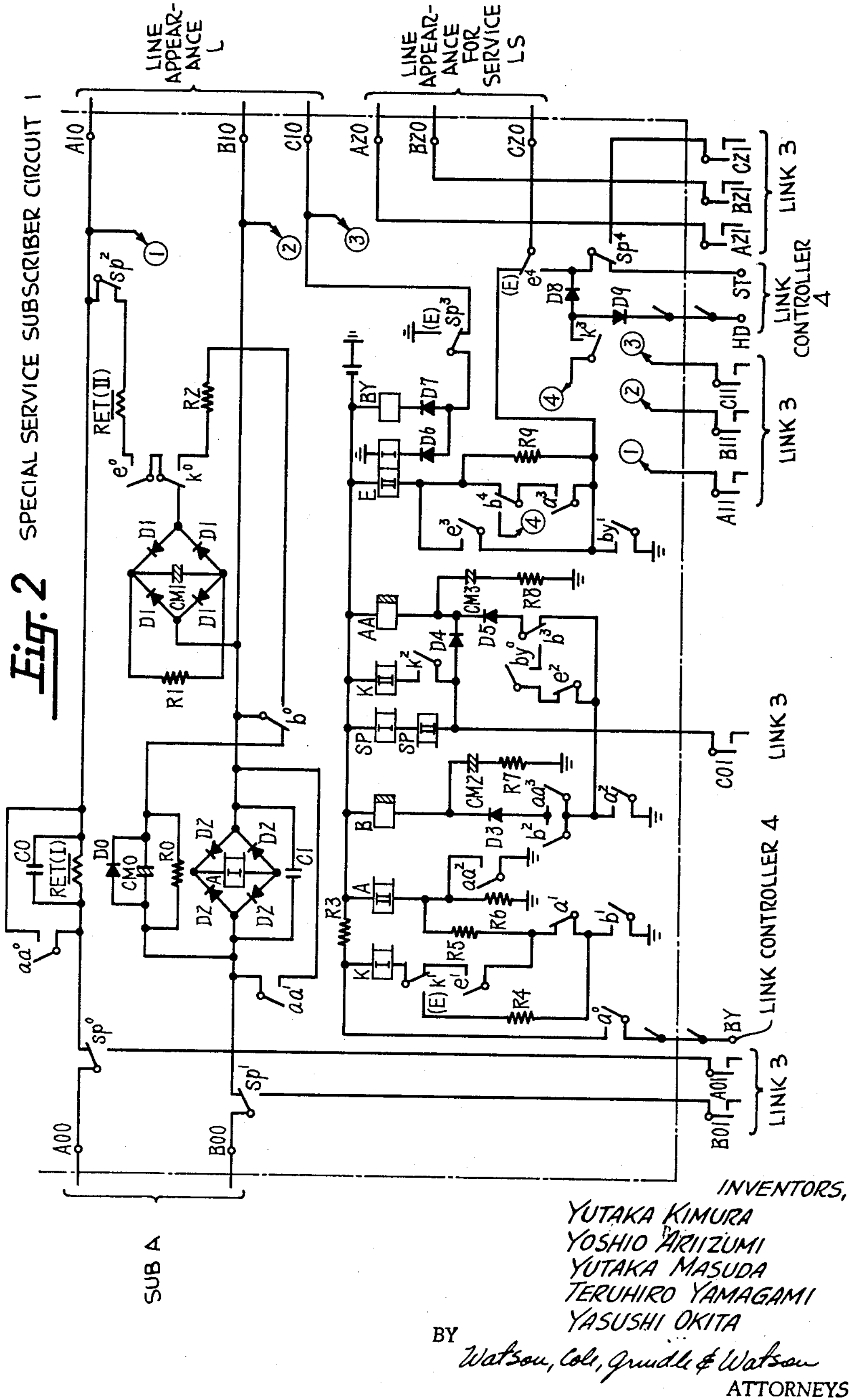
FIG. 2 is a diagram showing an embodiment of the special service subscriber circuit in FIG. 1.

In FIG. 2, when the service subscriber SUB A is off hook, it is connected to the switchboard side through the line appearance L through the terminal A10—retardation coil RET(I)—contact sp0—terminal A00—telephone SUB A—terminal B00—contacts $sp^1$—rectifier D2—relay A(I)—rectifier D2—terminal B10—to form a well-known subscriber originating call and initiates operation of an originating call register not illustrated.

In the special service subscriber circuit 1, as soon as the service subscriber SUB A is off hook, the relay A is operated by the relay AI inserted in the speech line. The contact $a^2$ of the relay A is made and the relay B operates through ground—contact $a^2$—contact $b^3$—rectifier D5—relay AA—battery. The contact $aa^3$ of the relay AA is made and the relay B operates through ground—contact $a^2$—contact $aa^3$—rectifier D3—relay B—battery.

When the service subscriber SUB A is connected to the originating call register, ground is connected from the switchboard side through a control line, that is, the line appearance L applied to the terminal $C^{10}$, to operate relay BY through ground—terminal C10—contact $sp^3$—rectifier D7—relay BY—battery.

By dialing the telephone number of the other subscriber SUB B, as well known, the service subscriber SUB A is connected with the subscriber SUB B in an ordinary speech connection. In this case, until the service subscriber SUB A calls the subscriber SUB B and is connected thereto, ground appears at the service line appearance through the ground—contact $by^1$—contact $e^4$—terminal C20. The indication of the connection is provided at the switchboard side so that the incoming of a new call may be prevented while the service subscriber SUB A is calling the subscriber SUB B. That is to say, when the subscriber SUB B responds, a pulse for the charge is sent out to the terminal C10 of the line appearance L from the switchboard and therefore the relay E operates through the terminal C10—contact $sp^3$—rectifier D6—relay E(I)—ground and is self-held through the ground—contact $by^1$—contact $e^3$—relay E(II)—battery. Therefore, the above described grounding of the terminal C20 is cut by the operation of the contact $e^4$ and the terminal C20 is indicated as vacant.

Now, when there is an incoming call from the subscriber SUB C to the service subscriber SUB A who is speaking with the subscriber SUB B, ground appears at terminal C20 through the switchboard and, in the special service subscriber circuit 1, a ground connection is completed to the link controller 4 through the terminal C20—contact $e^4$—contact $sp^4$—terminal ST to signal and start the link controller 4.

The link controller 4 starts the vacant special service common circuit 2, detects whether there is the ground connection in the terminal BY of the special service common circuit 2 shown in FIG. 3 and is connected to the special service common circuit 2 if there is the ground connection. The link controller 4 connects ground via the terminal CST of the special service common circuit 2 to operate the relay B of that circuit. The contact $b^{11}$ of the relay B operates, the relay ICC operates through ground—contact $rl^9$—contact $^{11}$—rectifier $D^9$—relay ICC—battery, its contact is closed and the loops of the speech lines of circuit 2 are closed. When the contact $b^3$ is closed, the relay RCV operates through ground—contact $by2^3$—*contact* $b^3$—contact $ch^2$—contact $hd^1$—relay RCV—battery.

The link controller 4 is connected to the above mentioned vacant special service common circuit 2, and at the same time closes the links 3 and connects the special service subscriber circuit 1 and special service common circuit 2 with each other.

Now, by the operation of the relay ICC, terminal C02 is ground through the ground—contact $icc^1$—terminal C02, and ground appears at relay SP in FIG. 2 through the link 3 (C01), the relay SP operates and the link 3 is also held by a known means by being grounded.

When the relay SP operates, the speech connection on the service subscriber SUB A side is transferred in the special service subscriber circuit 1 by the contacts $sp^0$ and $sp^1$ and is connected into the special service common circuit through the links 3 (AO1 and $BO^1$). Briefly, a loop through ground—relay A(I) of the special service common circuit 2—contact $b^1$—contact $icc^0$—terminal B02—link 3 (B01)—contact $sp^1$ of the special service subscriber circuit 1—terminal BO0—telephone SUB A—terminal A00—contact $sp^0$—link 3 (A01)—terminal A02 of the special service common circuit 2—contact $b^0$—relay A(II)—battery is made and the relay A in FIG. 3 operates. When the relay A operates, the relay HT operates through ground—contact $a^1$—relay HT—battery.

The speech connection on the switchboard side is connected to the terminal A12—contact $eml^0$—retardation coil RETO(II)—contact $b^2$—resistance R0—relay E1(I)—contact by $l^0$—contact $a^0$—retardation coil RETO(I)—contact $icc^2$—terminal 12 of the special service common circuit 2 in FIG. 3 through the links 3 (A11 and B11) from the terminals A10 and B10 of the special service subscriber circuit 1 in FIG. 2 to make a direct current circuit which becomes a holding loop for the switchboard side. As mentioned above, the speech connection between the service subscriber SUB A and subscriber SUB B who are speaking through the special service subscriber circuit 1 is connected into the special service common circuit 2 through the link 3 so that the service subscriber SUB A may speak with the subscriber SUB B through the special service common circuit 2.

Now, by the operation of the relay ICC in FIG. 3, as the contact $icc^4$ is made, the relay BY1, operates through the ground—contact $rl^9$—contact b11—rectifier D11—contact $icc^4$—relay BY1—battery. When the relay BY1 operates, the relay RL operates through the ground—contact $ht^2$—rectifier D7—contact $by1^4$—relay RL(II)—relay RL(I)—battery.

When the link of the special service subscriber circuit 4 and special service common circuit 2 is completed, on the line appearance L side the relay BY1 is held through ground (switchboard)—line appearance L—terminal C10 of the special service subscriber circuit 1—link 3 (C11)—terminal C12 of the special service common circuit 2—contact by $1^7$—rectifier D10—contact $icc^4$—relay BY1—battery. On the service line appearance LS side, the relay BY2 operates through ground (switchboard)—service line appearance LS—terminal C20 of the special service subscriber circuit 1—link 3 (C21)—terminal C22 of the special service common circuit 2—rectifier D12—relay BY2—battery.

When the speech connection is connected into the special service common circuit 2, the speech between the service subscriber SUB A and subscriber SUB B is interrupted temporarily, an incoming call signal (calling signal) is sent out to the service subscriber SUB A and the speech between them is resumed after about 1 second.

However, until the service subscriber SUB A responds to the subscriber SUB C, a service signal is mixed into the speech. That is, in the circuit in FIG. 3, as soon as the speech path is transferred, the relay BY2 operates, the above mentioned holding circuit of the relay RCV is opened by the contact $by2^3$ and, after a time interval (about 2 seconds), the relay RCV recovers slowly. Meanwhile, the speech connection is interrupted at the contacts $by2^0$, $by2^1$, $vrb^0$ and $rcv^1$ of the speech connection, the calling signal (through the terminal TG0—relay A(III)—contact $hd^7$—contact $rcv^3$—terminal RBT) from the signal source flowing to the relay A(III) and the service signal (through the terminal TG0—relay A(III)—contact $hd^7$—contact $rcv^3$—contact $chm^4$—terminal 120 DT) from the signal source are led to the relays A(I) and (II), the call number is transmitted to the service subscriber SUB A as an incoming call indicating signal and the service signal is transmitted to the service subscriber SUB A and subscriber SUB B. In the speech line in FIG. 3, a band-pass filter is inserted so that, in the case of transmitting the incoming call indicating signal, the speech between both subscribers may not be interrupted.

Here, if the service subscriber SUB A sends the transfer signal to the special service common circuit 2 through the special service subscriber circuit 1 and link 3 in order to respond to the incoming call by flashing the telephone receiver, the loop through the ground—relay A(I) of the special service common circuit—contact $b^1$—contact $icc^0$—terminal B02—link 3 (B01)—contact $sp^1$ of the special service subscriber circuit 1—terminal B00—telephone SUB A—terminal A00—contact $sp^0$—link 3 (A01)—terminal A02 of the special service common circuit 2—contact $b^0$—relay A(II)—battery is momentarily interrupted and the relay A recovers and then operates again. The momentary interruption means that interruption between the slow recovery time of the relay HT and the recovery time of the relay B in the special service common circuit 2. That recovery time is about 100 milliseconds to 1 second. The lower limit is provided to allow the apparatus unable to function by dial pulses in the case of using a rotary dial telephone. It is possible in the case of a push-button type telephone to make the lower limit less than 100 milliseconds.

Even if the relay A in the special service common circuit 2 is recovered, the relay CH operates through ground—contact $rl^1$—contact $ht^1$—contact $cha^4$—relay CH—battery and, if the above mentioned operating circuit of the relay A is made again by the flashing of the service subscriber SUB A telephone receiver, the relay A operates again and the relay HT operates. By the operation of the relay HT, the relay CHA operates through ground—contact $rl^1$—contact $ht^1$—contact $ch^0$—contact $cha^5$—relay CHA—battery. The relay CH is held through ground—contact $rl^1$—contact $ht^1$—contact $ch^0$—contact $cha^4$—relay CH—battery 11 and the relay CHA is held through ground—contact $rl^1$—rectifier D1—contact $ch^1$—contact $cha^5$—relay CHA—battery. When the relay CHA operates, the relay CHM operates through ground—contact $cha^8$—contact $ht^3$—contact $by2^8$—relay CHM—battery and is held through ground—contact $chm^3$—contact $by2^8$—relay CHM—battery. By the operation of the relay CHA, its contacts $cha^0$ and $cha^1$ are transferred, the speech connection between the service subscriber SUB A and subscriber SUB B is interrupted and the speech connection of the service subscriber SUB A is transferred to the service line appearance LS side.

That is to say, the speech connection of the service subscriber SUB A is transferred to the speech connection through the telephone SUB A—terminal A00 of the special service subscriber circuit 1—contact $sp^0$—link 3 (A01)—terminal A02 of the special service common circuit 2—contact $b^0$—condenser C0—contact $by2^0$—contact $rcv^0$—contact $cha^0$—contact $hd^2$—terminal $em2^1$—contact A22—link 3 (A21)—terminal A20 of the special service subscriber circuit 1—service line appearance LS—switch frame 5—trunk 9—telephone SUB C—trunk 9—switch frame 5—service line appearance LS—terminal B20 of the special service subscriber circuit—link 3 (B21)—terminal B22 of the special service common circuit 2—contact $icc^3$—contact $aa^1$—contact $cha^1$—contact $rcv^1$—contact $by2^1$—condenser C1—contact $b^1$—contact $icc^0$—terminal B02—link 3 (B01)—contact $sp^1$ of the special service subscriber circuit 1—terminal B00—telephone SUB A.

Further, by the operation of the relay CHM, the contacts $chm^1$ and $chm^2$ are closed so that the service subscriber SUB A may respond to the subscriber SUB C. That is, a direct current circuit through the telephone SUB C—trunk 9—switch frame 5—service line appearance LS—terminal B20 of the special service subscriber circuit 1—link 3 (B21)—terminal A22 of the special service common circuit 2—contact $em2^1$—contact $hd^2$—contact $chm^1$—retardation coil RET1 (II)—resistance R8—contact $hd^3$—retardation coil RET1 (I)—contact $chm^2$—contact $rl^3$—contact $c^1$—contact $icc^3$—terminal B22—link 3 (B21)—terminal B20 of the special service subscriber circuit 1—service line appearance LS—switch frame 5—trunk 9—telephone SUB C is made so that the service subscriber SUB A and subscriber SUB C are interconnected.

Moreover, the speech connection between the service subscriber SUB A and the subscriber SUB B is disconnected and the subscriber SUB B is held by the connection through the telephone SUB B—trunk 8—switch frame 5—line appearance L—terminal A10 of the special service subscriber circuit 1—link 3 (A11)—terminal A12 of the special service common circuit 2—contact $eml^0$—retardation coil RET0 (II)—contact $b^2$—resistance R0—relay E1 (I)—contact $by1^0$—contact $a^0$—retardation coil RET0 (I)—contact $icc^2$—terminal B12—link 3 (B11)—terminal B10 of the special service subscriber circuit 1—line appearance L—switch frame 5—trunk 8—telephone SUB B.

Further, from the signal source, a signal flows through the signal source—terminal TONE—contact $cha^{11}$—contact $by1^6$—retardation coil RET0 (II)—terminal TG1—signal source and, to the subscriber SUB B, a waiting signal fed to the retardation coils RET0 (I) and (II) is transmitted through the speech connection.

Next, when the service subscriber SUB A issues a transfer signal by the flashing of the telephone receiver in order to return the speech connection from the subscriber SUB C to the subscriber SUB B, in the special service common circuit 2, as mentioned above, the relays A and HT recover and operate again. When the relay HT recovers, the relay CHA is held through the ground contact $rl^1$—contact $ht^1$—contact $cha^5$—relay CHA—battery, but the relay CH recovers by disconnection of the holding circuit. Thereafter, when the relay HT operates, the above mentioned holding circuit of the relay CHA is also disconnected, the service subscriber SUB A is connected with waiting subscriber SUB B. The subscriber SUB C which has the speech connection with the service subscriber SUB A is disconnected and is held by the direct current circuit through the retardation coils RET1 (I) and (II) as mentioned above and a waiting signal from the signal source flowing through the signal source—terminal TONE—contact $cha^{11}$—retardation coil RET1 (II)—terminal TG1—signal source is provided to the retardation coils RET1 (I) and (II) and is sent to the subscriber SUB C through the speech connection.

In the same manner, if the service subscriber SUB A flashes the telephone receiver again, he can hold the subscriber SUB B, can speak with the subscriber SUB C and can speak any number of times by alternately transferring the connection. When the service subscriber SUB A has completed speaking with the subscriber SUB C and wants to disconnect the subscriber SUB C, if a flashing of the telephone receiver longer than the transfer signal is made during the speech connection with the subscriber SUB C, the special service common circuit 2 and link 3 are disconnected and the service subscriber SUB A returns to the original speech connection which is not through the special service common circuit 2 with the subscriber SUB B as explained above, the circuit, with the service subscriber SUB A on-hook, in the special service common circuit 2, the relays A and HT recover. When the relay HT recovers, the holding circuit of the relay B is disconnected and the relay B slowly recovers in about 1 second. The special service common circuit 2 does not recover with the recovery of the relay B but recovers with the recovery of the relay RL. However, the relay RL has a slow recovery time of 10 seconds.

Now, with the recovery of the relay B, the relay C operates through the ground—contact $b^{10}$—contact $cha^{10}$—contact $cha^{6}$—rectifier D5—contact $ch^{3}$—contact $b^{5}$—relay C—battery. However, when the relays A and HT recover as mentioned above, the relay CH recovers and the relay CHA is held.

Then, when the service subscriber SUB A off-hooks, the relays A, HT and B operate as mentioned above and the relay CHA recovers as mentioned above. The holding circuit of the subscriber SUB C is different from the above description depending on the operation of the relay C and changes to the route through the telephone SUB C—trunk 9—switch frame 5—service line appearance LS—terminal A20 of the special service subscriber circuit 1—link 3 (A21)—terminal A22 of the special service common circuit 2—contact $em2^{1}$—contact $hd^{2}$—contact $chm^{1}$—retardation coil RET1 (II)— resistance R8—contact $hd^{3}$—retardation coil RET1 (I)—contact $chm^{2}$—contact $rl^{3}$—contact $c^{1}$—contact $b^{6}$—contact $icc^{3}$—terminal B22—link 3 (B21)—terminal B20 of the special service subscriber circuit 1—service line appearance LS—switch frame 5—trunk 9—telephone SUB C but, by the operation of the relay B, the contact $b^{6}$ breaks and the above mentioned direct current loop is disconnected.

When the direct current loop is eliminated, the ground which was connected to the control line of the service line appearance LS, that is, to the terminal C22 of the special service common circuit 2, vanishes and the relay BY2 recovers. When the relay BY2 recovers by the contact $by2^{9}$, the holding circuit is disconnected and relay ICC recovers and, as the ground of the terminal CO2 of the special service common circuit 2 holding the link 3 is disconnected by the contact $icc^{1}$, the link 3 recovers. Then the relay SP of the special service subscriber circuit 1 recovers, the contacts $sp^{0}$ and $sp^{1}$ recover, the speech connection from which the special service common circuit 2 is separated returns and the relay A of the special service subscriber circuit 1 in the speech line operates so that the service subscriber SUB A may speak with the subscriber SUB B through the speech connection passed through the initial special service subscriber circuit 1. The separated special service common circuit 2 can be prepared for a special service connection from another subscriber.

HOLDING SERVICE

While the service subscriber SUB A is speaking with the subscriber SUB B through the special service subscriber circuit 1 in FIG. 2 the same as with the call-waiting service, when, depending on the contents of the speech, the service subscriber SUB A wants to call and consult the subscriber SUB C as a third person, the service subscriber SUB A flashing the telephone receiver.

When the speech loop is momentarily disconnected by the flashing of the telephone receiver, the relay A in the special service subscriber circuit 1 in FIG. 2 recovers and the relay K operates through the ground—contact $b^{1}$—contact $a^{1}$—contact $e^{1}$—contact $k^{1}$—relay K (I)—resistance $R^{3}$—battery.

Further, for the line appearance L side, the momentary disconnection of the speech loop by the flashing of the receiver is made through the terminal A10—contact $sp^{2}$—retardation coil RET (II)—contact $e^{0}$—contact $k^{0}$—rectifier D1—condenser CM1—rectifier D1—terminal B10 until the relay K operates. After the relay K operates, a direct current loop through the terminal A10—contact $sp^{2}$—retardation coil RET (II)—contact $e^{0}$—contact $k^{0}$—resistance R2—contact $b^{0}$—terminal B10 is made so as to prevent the direct current circuit from being momentarily disconnected on the switchboard side.

When the relay A operates again, the link controller 4 is actuated from the special service subscriber circuit 1 through the ground—contact $by^{1}$—contact $a^{3}$—contact $b^{4}$—contact $k^{3}$—rectifier D8—contact $sp^{4}$ terminal ST of the link controller 4. Further, through the ground—contact $by^{1}$—contact $a^{3}$—contact $b^{4}$—contact $k^{3}$—rectifier D9—terminal HD of the link controller 4, the holding information is sent to the link controller 4.

As described above in the case of the call-waiting service, when the link controller 4 is actuated from the special service subscriber circuit 1, it connects the vacant special service common circuit 2 and connects the ground from the terminal CST of the special service common circuit 2 in FIG. 3 and operates the relay B. At the same time, the link controller 4 sends out the holding information via the ground to the terminal HD of the special service common circuit 2 and operates the relay HD.

In the special service common circuit 2 in FIG. 3, by the operation of the relay HD, the relay ICC operates through the ground—contact $hd^{5}$—relay ICC—battery. Further, the relay CH operates through the ground—contact $chm^{3}$—rectifier DO—contact $hd^{0}$—relay CH—battery.

When the relay ICC operates, as described above in the call-waiting service, the relay SP operates through the ground—contact $icc^{1}$—terminal C02—link 3 (C01)—relay SP (II) of the special service subscriber circuit 1—relay SP (I)—battery and, by the contacts $sp^{0}$ and $sp^{1}$, the speech connection is diverted into the special service common circuit 2 from the special service subscriber circuit 1. That is, the speech connection is diverted into the special service common circuit 2 through the route the ground—relay A (I)—contact $b^{1}$—contact $icc^{0}$—terminal B02 of the special service common circuit 2—link 3 (B01)—contact $sp^{1}$ of the special service subscriber circuit 1—terminal B00—telephone SUB A—terminal A00 of the special service subscriber circuit 1—contact $sp^{0}$—link 3 (A01)—terminal A02 of the special service common circuit 2—contact $b^{0}$—relay A (II)—battery and the relay A of the special service common circuit 2 operates.

Moreover, as soon as the relay SP of the special service subscriber circuit 1 operates, an electric current flows to relay K (II) connected in parallel, the relay K (I) is reversely excited, the relay K recovers and the starting route from the special service subscriber circuit 1 to the link controller 4 is disconnected.

On the line appearance L side of the switchboard, as in the case of the call-waiting service, a direct current loop is made through the line appearance L—terminal A10 of the special service subscriber circuit 1—link 3 (A11)—terminal A12 of the special service common circuit 2—contact $em1^{0}$—retardation coil RETO (II)—contact $b^{2}$—resistance R0—relay E1 (I)—contact $by1^{0}$—contact $a^{0}$—retardation coil RETO (I)—contact $icc^{2}$—terminal B12—link 3 (B11)—terminal B10 of the special service subscriber circuit 1—line appearance L and the subscriber SUB B is held.

In the special service common circuit 2, when the relay ICC operates, the relay BY1 operates through the ground—contact $rl^9$—contact $b^{11}$—rectifier D11—contact $icc^4$—relay BY1—battery and is held by the ground of the switchboard — terminal C12 — contact $by1^7$ — rectifier D10—contact $icc^4$—relay BY1—battery. When the relay BY1 operates, the relay RL operates through the ground—contact $ht^2$—rectifier D7—contact $by1^4$—relay RL (II)—relay RL (I)—battery.

In the case of this holding service, as soon as the speech connection is diverted into the special service common circuit 2, the speech connection is transferred from the line appearance L side to the service line appearance LS side in the special service common circuit 2. That is, when the relay HT operates, the relay CHA operates through the ground—contact $rl^1$—contact $ht^1$—contact $ch^0$—contact $cha^5$—relay CHA—battery and is held through the ground—contact $rl^1$—rectifier D1—contact $ch^1$—contact $cha^5$—relay CHA—battery. When the relay CHA operates, the relay CHM operates through the ground—contact $cha^8$—contact $ht^3$—contact $hd^4$—relay CHM—battery. Subscriber SUB A is transferred by the operation of the relay CHA to make a route through the service line appearance LS—terminal A20 of the special service subscriber circuit 1—link 3 (A21)—terminal A22 of the special service common circuit 2—contact $em2^1$—contact $hd^2$—contact $aa^2$—contact $aa^3$—contact $cha^0$—contact $by2^0$—condenser C0—contact $b^0$—terminal A02—link 3 (A01)—contact $sp^0$ of the special service subscriber circuit 1—terminal A00—telephone SUB A—terminal B00 of the special service subscriber circuit 1—contact $sp^1$—link 3 (B01)—terminal B02 of the special service common circuit 2—contact $icc^0$—contact $b^1$—condenser C1—contact $by2^1$—contact $cha^1$—contact $aa^1$—contact $icc^3$—terminal B22—link 3 (B21)—terminal B20 of the special service subscriber circuit 1—service line appearance LS and is connected to the service line appearance LS.

In the direct current loop for the switchboard side, when the relay CHM operates, a connection through the switchboard—service line appearance LS—terminal A20 of the special service subscriber circuit 1—link 3 (A21)—terminal A22 of the special service common circuit 2—contact $em2^1$—contact $hd^2$—contact $aa^2$—contact $aa^3$—contact $chm^1$—retardation coil RET1 (II)—resistance R8—relay E2 (I)—contact $hd^3$—retardation coil RET1 (I)—contact $chm^2$—contact $rl^3$—contact $c^1$—contact $icc^3$—terminal B22—link 3 (B21)—terminal B20 of the special service subscriber circuit 1—service line appearance LS—switchboard is formed and the service subscriber SUB A connects and actuates an originating call register (not illustrated) of the switchboard by a well known exchange connecting method. After hearing the originating call signal sent from the originating call register, by dialing the telephone number of the subscriber SUB C, the service subscriber SUB A can call the subscriber SUB C by a well-known exchange connecting method.

Thereafter, the same as with the call-waiting service, while the service subscriber SUB A is speaking with the subscriber SUB C, a waiting signal is sent to the subscriber SUB B.

Thereafter, when the service subscriber SUB A wants to have the subscriber SUB C wait and to speak with the original subscriber SUB B, the same as with the call-waiting service, if the telephone receiver is flashed, the subscriber SUB C can be held and the speech connection with the subscriber SUB B can be returned. It is needless to say that, in this case, a waiting signal is sent to the subscriber SUB C.

Further, as in the case of the call-waiting service, the operation is the same in that the above mentioned speech transfer can be made any number of times alternately between the subscriber SUB B and subscriber SUB C.

FIG. 4 shows the second embodiment of the present invention as applied to a common controlled automatic telephone exchange system. In this second embodiment, the service line appearance LS in the first embodiment shown in FIGS. 1 to 3 can be used in common by a plurality of subscribers so that it may be more economical than the first embodiment.

Therefore, it is understood that this second embodiment is different from the first embodiment in the components relating to the service line appearance LS but has substantially the same formation and functions with respect to the other parts as is apparent from the following description.

The special service subscriber circuit 1 functions so that, in the case of forming a special service, the speech connection is diverted into the special service common circuit 2 by the transfer signal from the service subscriber SUB A, or the incoming signal to the service line appearance LS from the switchboard side.

The special service subscriber circuit 1 corresponds to the service subscriber and is connected with the service subscriber telephone SUB A. The special service subscriber circuit 1 is connected to the switch frame 5 of the switchboard through the line appearance L on the side opposite the above mentioned side and is further connected with the later described special service common circuit 2 through the link 3.

A proper number of the special service common circuits 2 are set in response to the service call number of a group a number of service subscribers so as to be used in common by them and transfer the speech connection with the transfer signal from the service subscriber SUB A. Further, the special service common circuit 2 is connected to the switch frame 5 of the switchboard through the service line appearance LS.

As mentioned above, the special service subscriber circuit 1 corresponds to the service subscriber and, further, the special service common circuit 2 is set so as to be used in common by a group of a number of subscribers. Therefore, there is no 1:1 correspondence between them. Therefore, they are connected with each other through the link 3 controlled by the link controller 4.

The line appearance L corresponds to the service subscriber and the service line appearance LS corresponds to a group of a number of service subscribers, that is, to the special service common circuit 2. They have such a two-circuit representing function as is well-known so that, in the case of ordinary speech, the line appearance L may be used and, in the case of a special service, the service line appearance may be used.

The other devices not described in FIG. 4 have already been described in the first embodiment.

The following is a description of the call-waiting service.

Now, while the service subscriber SUB A is speaking with the subscriber SUB B through the service subscriber SUB A—special service subscriber circuit 1—line appearance L—switch frame 5—trunk 8—subscriber SUB B, if there is an incoming call to the service subscriber SUB A through the trunk 9 and switch frame 5 from the subscriber SUB C, by a known method, the marker 6 receives the telephone number of the service subscriber SUB A and transfers it to the number group 7. In the number group 7, a representative circuit is formed of the line appearance L of the switch frame 5 corresponding to the subscriber SUB A and the service line appearance LS of the switch frame 5 corresponding to the special line common circuit 2 and, therefore, as in the first embodiment, the number group 7 sends the position information of the service line appearance LS back to the marker 6. At the same time, in the number group 7, as it can be recognized from the telephone number of the service subscriber SUB A that the service subscriber SUB A is a call-waiting service subscriber the information that the service subscriber SUB A is a call-waiting service subscriber is sent to the marker 6 from the number group 7. In the marker 6, the switch frame 5 is controlled from the position information of the service line appearance LS in the switch frame 5 and the position information of the trunk 9 separately received by a known method. The trunk 9 and special service common circuit 2 are connected with each other through the switch frame 5.

Next, as the marker 6 has received the call-waiting service information from the number group 7, it does not recover but it connects with the number group 7 again and transfers the telephone number of the service subscriber SUB A to the number group 7. At this time, as the number group 7 is controlled from the marker 6 so as to make no representative selection, the position information of the line appearance L of the service subscriber SUB A is transferred to the marker 6 from the number group 7. The marker 6 connects ground to a control line other than the known control line of the service subscriber SUB A through the line appearance L from the above mentioned information. As that control line is connected to the special service subscriber circuit 1, the special service subscriber circuit 1 is connesected to ground and actuates the link controller 4. The link controller 4 connects the special service subscriber circuit 1 corresponding to the service subscriber SUB A with the special service common circuit 2 by closing the link 3. Thus the speech connection is diverted into the special service common circuit 2 by the special service subscriber circuit 1 and, as in the first embodiment, the service subscriber SUB A can speak with the subscriber SUB B through the special service common circuit 2. Thereafter, the sending of the incoming call indicating signal, the flashing operation of the service subscriber SUB A telephone receiver and the holding of the subscriber SUB B are the same as in the case of the first embodiment.

However, it is apparent that the speech connection, after being transferred and connected in the special service common circuit 2, is through the service subscriber SUB A—special service subscriber circuit 1—link 3—special service common circuit 2—service line appearance LS—switch frame 5—trunk 9—subscriber SUB C.

Thereafter, such operations as the transferring of the speech alternately to the subscribers SUB B and SUB C and of diverting the subscriber SUB C are the same as in the first embodiment and shall not be explained further.

The following is a description of a holding service.

When the service subscriber SUB A speaking with the subscriber SUB B through the speech route through the service subscriber SUB A—special service subscriber circuit 1—line appearance L—switch frame 5—trunk 8—subscriber SUB B wants to call the subscriber SUB C, the service subscriber SUB A tells the subscriber SUB B that the speech connection will be interrupted in order to call the third person and then the service subscriber SUB A sends a transfer signal by flashing the receiver and thereby signaling the special service subscriber circuit 1. The special circuit subscriber circuit 1 receives the transfer signal, holds, and actuates the link controller 4. The link controller 4 selects a vacant special service common circuit 2 and connects the special service subscriber circuit 1 with the special service common circuit 2 by closing the link 3. Thus the speech path is diverted into the special service common circuit 2 by the special service subscriber circuit 1 and a connection through the service subscriber SUB A—special service subscriber circuit 1—link 3—special service common circuit 2—link 3—special service subscriber circuit 1—line appearance L—switch frame 5—trunk 8—subscriber SUB B is formed. As soon as the above mentioned connection is made, the speech connection is transferred to the service line appearance LS side in the special service common circuit 2, the line appearance L side is held and a waiting signal is sent to the subscriber SUB B.

Moreover, at the same time, the service subscriber SUB A is connected to a well-known originating call register (not illustrated) through the service line appearance LS connected directly with the special service common circuit 2.

The subsequent operations are the same as in the first embodiment.

However, it is apparent that the connection between the service subscriber SUB A and subscriber SUB C is through the service subscriber SUB A—special service subscriber circuit 1—link 3—special service common circuit 2—service line appearance LS—switch frame 5—trunk 9—subscriber SUB C.

The second embodiment shall be explained with reference to the circuit diagrams shown in FIGS. 5 and 6.

FIG. 5 shows the special service subscriber circuit 1 and is exactly the same as FIG. 2 of the first embodiment except that the connection to the service line appearance LS is eliminated. However, a control line than the known control line other, for example via terminal C30, is required additionally.

FIG. 6 shows the special service common circuit 2 and is exactly the same as FIG. 3 of the first embodiment except with respect to the minor addition and alteration as the relay RS and terminal HDA and the terminals A22, B22 and C22 are connected directly to the service line appearance LS. Therefore, its operations are substantially the same as the operations of the first embodiment explained with reference to FIGS. 2 and 3 and therefore only the differences between the circuitry illustrated in the aforementoined figures shall be explained. Further, the following description is with reference to FIG. 4.

CALL-WAITING SERVICE

As explained with respect to FIG. 4, when the subscriber SUB C is connected to the service subscriber SUB A who is speaking with the subscriber SUB B, for the first time, the marker 6 connects with the number group 7 and keeps the subscriber SUB C connected to the special service common circuit 2 through the trunk 9, switch frame 5 and service line appearance LS. In this case, in the special service common circuit 2 in FIG. 6, as the ground is connected to the terminal C22 from the switchboard, by that ground connection, the relay RS operates through the ground —terminal C22—rectifier D1—contact $b^{12}$—relay RS—battery. When the relay RS operates, its contact $rs^0$ is closed, the link controller 4 is grounded through the terminal BY through the earth—contact $rl^9$—contact $b^{11}$—contact by $2^6$—contact $rs^0$—contact $aa^4$—terminal BY and only the above mentioned special service common circuit 2 is kept vacant for the link controller 4. Then, as explained with reference to FIG. 4, when the marker 6 connects with the number group 7 for the second time and receives the subscriber position information of the service subscriber SUB A, a control line other than the known control line of the special service subscriber circuit 1 corresponding to the service subscriber SUB A, that is, via terminal C30 in FIG. 5 is connected to ground through the switch frame 5. When the ground is connected, the link controller 4 is actuated through the ground —terminal C30—contact $e^4$—contact $sp^4$—contact ST. The link controller 4 connects the special service common circuit 2 which has been already obtained, and is indicated to be vacant, with the special service subscriber circuit 1 corresponding to the service subscriber SUB A by closing the link 3 to form a speech connection between the service subscriber SUB A and the subscriber SUB C. The subsequent operations are the same as in the first embodiment.

HOLDING SERVICE

As explained in FIG. 4, while the service subscriber SUB A is speaking with the subscriber SUB B, the service subscriber SUB A flashes the telephone receiver to call the subscriber SUB C. When the special service subscriber circuit 1 receives holding information thereby, it actuates the link controller 4. When the link controller 4 receives the holding information, it connects ground to the terminal HDA of each special service common circuit 2 shown in FIG. 6 and the relay RS of each special service common circuit 2 is operated through the ground —terminal HDA—relay RS—battery. By the operation of the relay RS, the ground appears at the terminal BY of the special service common circuit 2 which is not being used through the ground —contact $rl^9$—contact $b^{11}$—contact by $2^6$—contact $rs^0$—contact $aa^4$—terminal BY. The link controller 4 obtains access to one of the vacant special service common circuits and connects it with the special service subscriber circuit 1 corresponding to the service subscriber SUB A.

In the first embodiment, the service line appearance LS is connected to the terminals A22, B22 and C22 of the special service common circuit 2 through the special service subscriber circuit 1. But, in this embodiment, the line appearance LS is connected directly to the terminals A22, B22 and C22 of the special service common circuit 2 in FIG. 6. Therefore, when the special service common circuit 2 is connected to the special service subscriber circuit 1, a loop through the terminal A22—contact $em2^1$—contact $hd^2$—contact $aa^2$—contact $aa^3$—contact $chm^1$—retardation coil RET1 (II)—resistance R8—relay E2 (I)—contact $hd^3$—retardation coil RET1 (I)—contact $chm^2$—contact $rl^3$—contact $c^1$—contact $icc^3$—terminal B22 is made for the service line appearance LS. Thereby the service subscriber SUB A is connected to the switchboard through the service line appearance LS and is connected to an originating call register (not illustrated) by a known method so that a dial tone may be heard. The subsequent operations are exactly the same as in the first embodiment.

What is claimed is:

1. A telephone switching system for providing normal connection and special connection functions between telephone subscribers, comprising:
- a plurality of special service subscriber circuits, each of said subscriber circuits associated with a respective special service telephone subscriber for receiving special service information requests therefrom,
- a special service circuit common to said plurality of special service subscriber circuits for transferring a normal connection between at least one of said special service telephone subscribers and a telephone subscriber to a separate connection between said at least one of said special service telephone subscribers and a third subscriber,
- common controlled automatic switching means,
- each of said plurality of special service subscriber circuits being connected between said common controlled automatic switching means and said special service telephone subscribers by a first line appearance for said normal connection and said separate connection is established by a connection through said special service common circuit,
- means interconnecting each of said special service subscriber circuits with said special service circuit, and
- said common controlled automatic switching means including means for interconnecting either of said first line appearance or said special service line appearance with said telephone subscriber or said third subscriber in accordance with control signals generated by said special service subscribers.

2. A telephone switching system as in claim 1 wherein each of said special service subscriber circuits and said common controlled automatic switching means are interconnected by said first line appearance and said special service line appearance.

3. A telephone switching system as in claim 1 wherein each of said special service subscriber circuits is connected to said common controlled automatic switching means by a first line appearance and said special service circuit is connected to said common controlled automatic switching means by said special service line appearance.

References Cited

UNITED STATES PATENTS

| | | | |
|---|---|---|---|
| 2,819,345 | 1/1958 | Nilsson | 179—18 BG |
| 3,242,266 | 3/1966 | Strobelt et al. | 179—18BD |
| 3,355,555 | 11/1967 | Thelemaque | 179—18 BG |
| 3,488,751 | 1/1970 | Gerke et al. | 179—18 BD |
| 3,546,393 | 12/1970 | Joel | 179—18 B |

WILLIAM C. COOPER, Primary Examiner